US012800138B2

(12) United States Patent
Minshall

(10) Patent No.: US 12,800,138 B2
(45) Date of Patent: Nov. 17, 2026

(54) LIGHT DISPLAY SYSTEMS ON OR WITHIN DOORS AND WINDOWS

(71) Applicant: Tyler J. Minshall, Acton (CA)

(72) Inventor: Tyler J. Minshall, Acton (CA)

( * ) Notice: Subject to any disclaimer, the term of this patent is extended or adjusted under 35 U.S.C. 154(b) by 0 days.

(21) Appl. No.: 19/197,230

(22) Filed: May 2, 2025

(65) Prior Publication Data

US 2025/0347406 A1 Nov. 13, 2025

Related U.S. Application Data

(60) Provisional application No. 63/646,020, filed on May 13, 2024.

(51) Int. Cl.
*F21V 33/00* (2006.01)
*E06B 7/28* (2006.01)
*F21V 3/02* (2006.01)
*F21Y 115/10* (2016.01)

(52) U.S. Cl.
CPC .............. *F21V 33/006* (2013.01); *E06B 7/28* (2013.01); *F21V 3/02* (2013.01); *F21Y 2115/10* (2016.08)

(58) Field of Classification Search
CPC ......... G02F 1/133608; G02F 1/133615; G02B 6/0068; G02B 6/00; F21V 33/00; F21V 3/02; F21Y 115/10
See application file for complete search history.

(56) References Cited

U.S. PATENT DOCUMENTS

| | | | |
|---|---|---|---|
| 7,223,010 B2 | 5/2007 | Min et al. | |
| 2012/0320627 A1 | 12/2012 | Araki et al. | |
| 2017/0248289 A1 | 8/2017 | Vasylyev | |
| 2018/0348423 A1* | 12/2018 | Vasylyev | G02B 6/0091 |

FOREIGN PATENT DOCUMENTS

WO WO2020/092717 A1 5/2020

OTHER PUBLICATIONS

International Search Reported for related PCT Application No. PCT/IB2025/054862 dated Sep. 2, 2025.
International Search Report for corresponding PCT Application No. PCT/IB2025/054862 dated Sep. 2, 2025.

* cited by examiner

*Primary Examiner* — William J Carter
(74) *Attorney, Agent, or Firm* — Caesar Rivise, PC

(57) ABSTRACT

A lighting system for installation around window panels to provide sophisticated visual effects. The lighting system involves the use of an LED lighting strip that is secured around the entire periphery the window panel. For one window panel, formed from multiwall polycarbonate (MWP) material, the MWP material is configured at its edges to receive the LED lighting strip then treated with a chemical resistant sealant and a trim applied around the panel. When the strip is energized an "infinity mirror" effect is created, the impression of multiple LED strips horizontally displayed across the panel. Another clear panel uses a diffuser along its edges to house the lighting strip to form a panel frame of changing colors without disturbing visibility through glass. A third panel involves inserting the strip into a sealed glass/plexiglass unit before the spacer is inserted; once the strip is installed, the spacer installed, the sealant is applied.

10 Claims, 14 Drawing Sheets

LIGHT DISPLAY SYSTEMS ON OR WITHIN DOORS AND WINDOWS

CROSS-REFERENCE TO RELATED APPLICATIONS

This non-provisional application claims the benefit under 35 U.S.C. § 119(e) of Application Ser. No. 63/646,020 filed on May 13, 2024 and whose entire disclosure is incorporated by reference herein.

BACKGROUND OF THE INVENTION

This present invention relates to lighting systems, and more particularly, to a LED lighting system installed on or within doors and windows for creating sophisticated visual effects both simple and complex.

Although providing special visual effects using LEDs (light emitting diodes) is well-known, there is a desire to provide special lighting effects in windows and doors. One example of such special lighting effects are implemented in car washes where different lighting effects can be seen from the outside of the car wash to the public.

However, many of these lighting systems are visible through windows but not located in or on the windows themselves. Thus, there remains a need to provide special lighting effects within or directly on the windows themselves and in windows of doors. The present invention solves this problem.

All references cited herein are incorporated herein by reference in their entireties.

BRIEF SUMMARY OF THE INVENTION

A window configured for presenting visual effects using light emitting diodes (LEDs) is disclosed. The window comprising: a window panel comprising a multiwall polycarbonate (MWP) material having a periphery; an LED lighting strip secured to a channel that is secured to an entirety of the periphery of the window panel of the MWP material; and a chemical resistant sealant applied over the channel around the entirety of the periphery.

A window configured for presenting visual effects using light emitting diodes (LEDs) is disclosed. The window comprises: a window panel comprising a transparent or translucent material having a periphery; and a hollow diffuser frame, formed of a semi-transparent material, secured around an entirety of the periphery of the transparent or translucent material, wherein the hollow diffuser frame comprises an LED lighting strip positioned therein to surround the transparent or translucent material.

A method for creating a window to have visual effects using light emitting diodes (LEDs) is disclosed. The method comprises: configuring a periphery of a window panel to position an LED lighting strip thereabout; sealing the periphery of the window panel using a chemical resistant sealant; applying a trim around the sealed periphery to form the window having visual effects; and installing the window into a door or window frame.

BRIEF DESCRIPTION OF SEVERAL VIEWS OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE PREFERRED EMBODIMENTS

Figure 1:
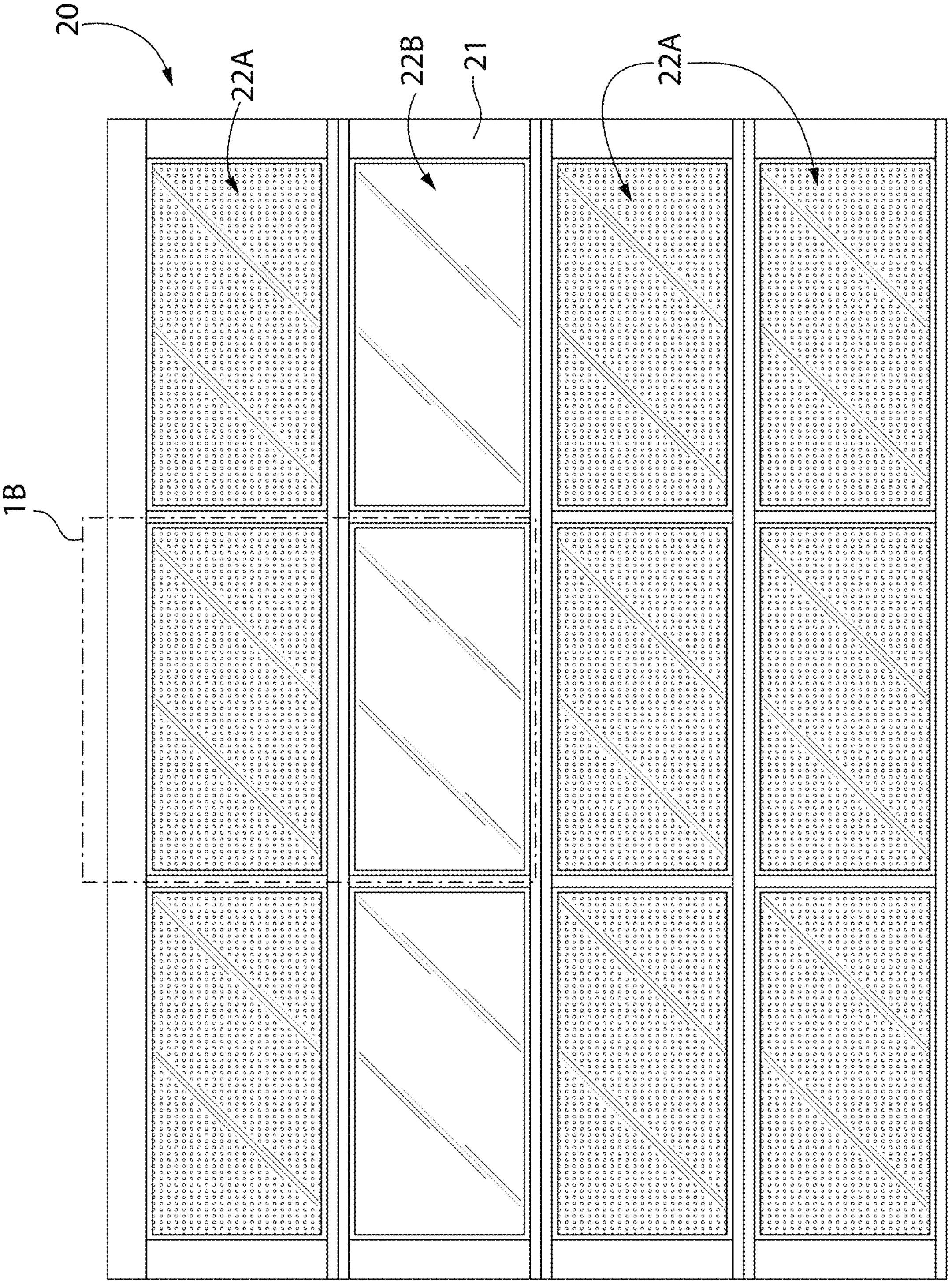
FIG. 1 is a plan view of an exemplary car wash door having window panels including the inventive lighting system of the present invention comprising a plurality of multiwall polycarbonate (MWP) material panels and clear window pane (CWP) panels.

Referring now to the figures, wherein like reference numerals represent like parts throughout the several views, exemplary embodiments of the present disclosure will be described in detail. Throughout this description, various components may be identified having specific values, these values are provided as exemplary embodiments and should not be limiting of various concepts of the present invention as many comparable sizes and/or values may be implemented.

The proposed light display system incorporates innovative technology involving the installation of lighting elements on or within doors and windows to create sophisticated visual effects. Several key features include:

1. Addressable LED Technology (or similar future technologies): Utilizes programmable, addressable LEDs to generate dynamic lighting patterns on doors and windows.
2. Versatile Design: Engineered for use in both wet and dry environments, accommodating a variety of applications.
3. Universal Compatibility: Compatible with any type of clear or translucent material, enabling seamless integration.
4. Status Indicators: Capable of indicating bay occupancy (e.g., empty/full/car wash in use) and/or door position/status (e.g., open, closed or in motion).
5. Interconnected Effects: Supports synchronization across multiple panels, sections, and doors and windows for cohesive visual effects.
6. Interactive Gaming Capability: Offers potential for interactive games, such as, but not limited to, Tic-Tac-Toe.
7. Vehicle Guidance: Provides visual cues, e.g., for vehicle movement (Stop/Go/Wait/Reverse).
8. Control Flexibility: Offers both wireless and wired control options for maximum adaptability.
9. Audio-Responsive Programming: Programmable to respond to, but without limitation to, sound or music, creating an immersive experience.
10. Surface Mount Strip: Can be installed with a diffuser to create a seamless, surface-mounted lighting strip for transparent or translucent material windows.

The following discussion describes the implementation of lighting systems into windows of car wash doors. However, this is only by way of example. The inventive lighting system can be used a wide variety of industrial and other commercial products involving windows or observation portals. Thus, the following discussion is simply an exemplary implementation using car wash doors with the understanding that the system/method can easily be adapted to other products and diverse applications.

As will be discussed below, the invention of the present application allows for the creation of sophisticated visual effects, both simple and complex. Simple visual effects are generally considered solid colors with no movement. They are typically used for providing directions, e.g., red implies "stop", green for "go" and yellow/orange for "caution". Complex visual effects are generally considered ones where there is dynamic lighting, such as a wipe or rainbow effect with a changing orientation.

As shown in FIG. 1, an inventive LED lighting system 20 of the present invention is installed on multiple panels on a car wash overhead door 21. In particular, the lighting system 20 is installed into multiwall polycarbonate (MWP) panels 22A and clear glass window (CWP) panels 22B, again, by way of example only. The arrangement of MWP panels 22A and CWP panels 22B are also by way of example only (3×4 array) and even the size of the car wash door 21 can vary (e.g., 10'×10'; 16'×16'; 20'×20', etc.). Both the MWP panels 22A and the CWP panels 22B can vary in size; in this application, the MWP panels 22A and CWP panels 22B may comprise 21 inches×38 inches, again by way of example only.

MWP Panel 22

Figure 1A:
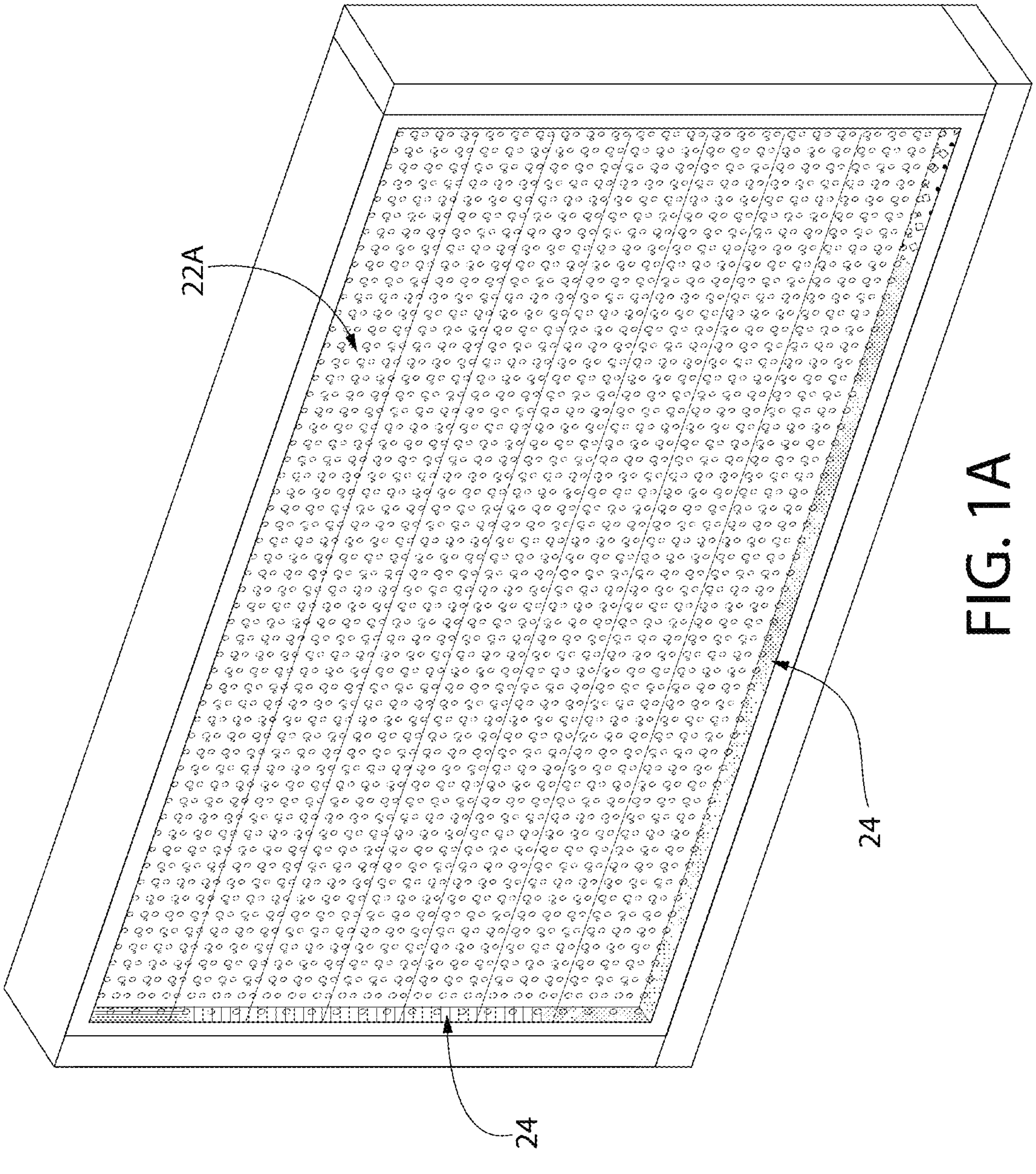
FIG. 1A depicts the "infinity mirror" effect by using LED lighting strips on the periphery of the panel used in combination with the multiwall polycarbonate (MWP) material, as well as the lighting effect in a clear window pane (CWP) panel.
Figure 1B:
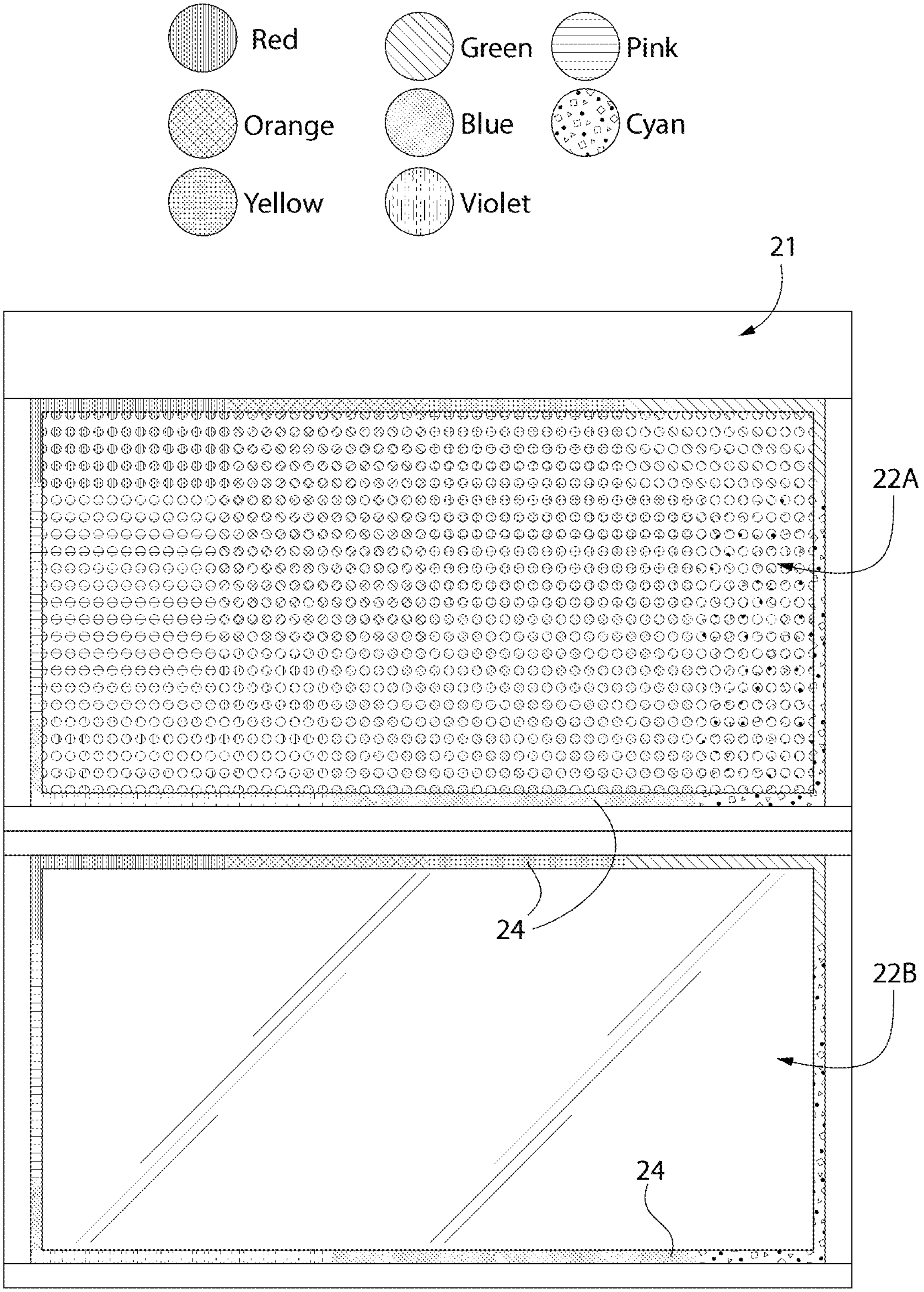
FIG. 1B depicts a region 1B in FIG. 1 that includes the "infinity mirror" effect as seen by observer looking at the entire MWP panel of the present invention.

Both the MWP panels 22A and the CWP panels 22B utilize LED lighting strips 24, e.g., LED strips (e.g., LED T24C-5-WT-3 meter long (60 LEDs/meter)) that emit various (e.g., 16,777,216 possible) LED light colors. Both the MWP panels 22A (FIGS. 1A-1B) and the CWP panels 22B (FIG. 1B) position the LED lighting strips 24 around the periphery of the panels. However, the lighting effects achieved are different. As can be seen most clearly in FIG. 1, for all of the MWP panels 22A (i.e., the top row, the third row down and the bottom row), the effect of the LED lighting strips 24 illuminating the MWP panel 22A internal walls causes many reflections, (also referred to as the "Infinite Mirror" or "Infinity Mirror" effect), thereby giving the appearance that there are horizontal strips of LEDs when, in fact, the LED lighting strips are only present on the periphery of the MWP panels 22A. It should be noted that different types of multiwall panels can also create other types of effect due to, for example, the angle of the walls in the MWP and the number of layers in the MWP. FIGS. 1A and 1B show this effect in greater detail. Thus, use of the MWP material and the LED lighting strips in the periphery only reduce the number of LEDs that are needed to provide for this effect. In contrast, the CWP 22B panels support the various colors only around the diffuser frame portion, as will be discussed in detail later.

Figure 1C:
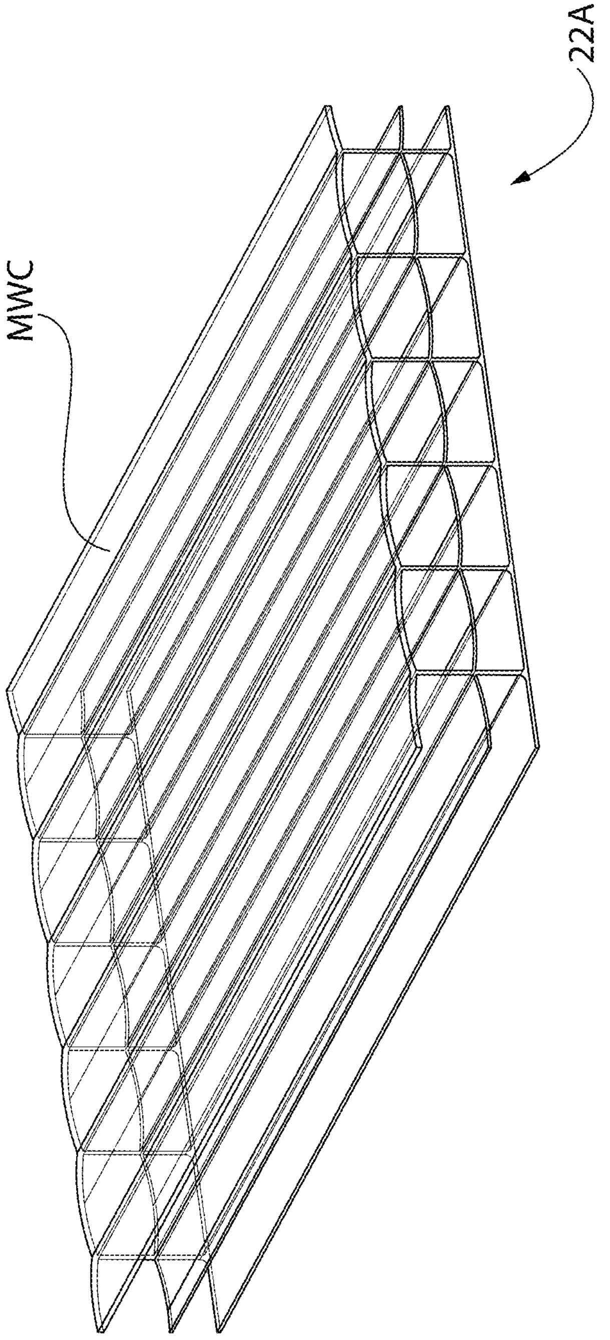
FIG. 1C is an isometric view of the multiwall polycarbonate (MWP) material prior to installation of the LED lighting strips.
Figure 1D:
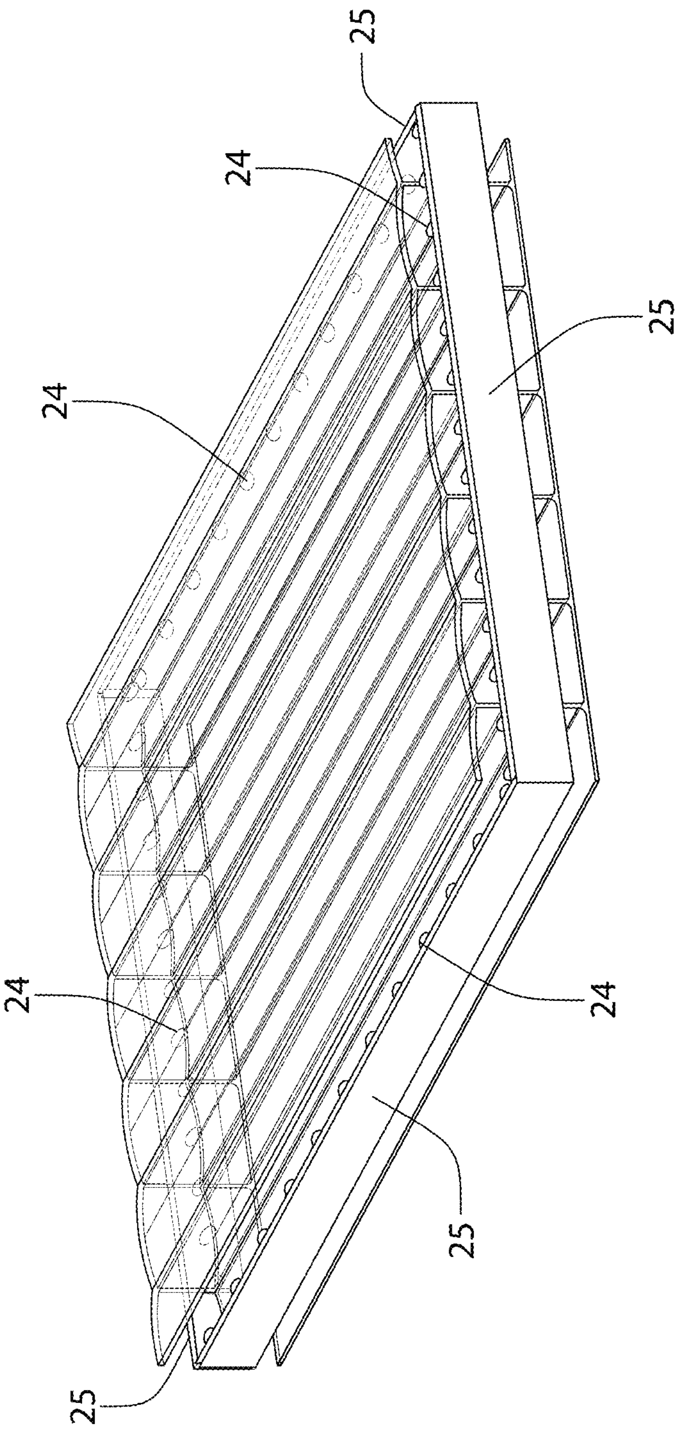
FIG. 1D is an isometric view of the multiwall polycarbonate (MWP) material with a channel routed into the outside edges of the MWP material with the LED lighting strips mounted on the inside surface of the channel.

FIG. 1C depicts the multiwall polycarbonate (MWP) material prior to the installation of the LED lighting strips 24. To form the MWP panel 22A, a channel 25 (FIG. 1D) must be routed into the outside edges of the MWP material (FIG. 1C) in order to receive the LED lighting strips 24. As a result, by conducting this routing process, the LED lighting strips 24 are positioned within the outer edge of the MWP panel 22A wall.

Figure 1E:
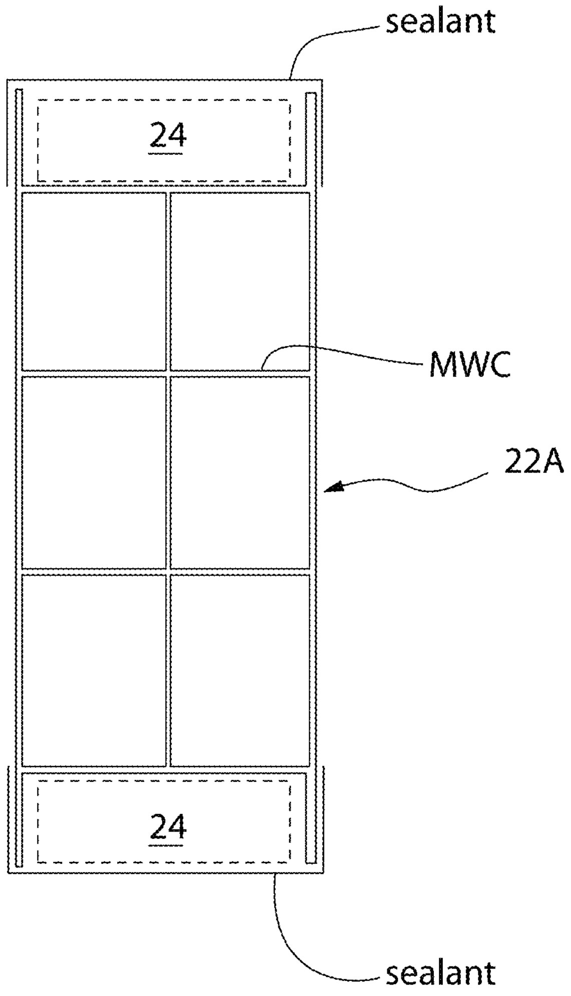
FIG. 1E is a functional diagram of an end view of the MWP panel just after the sealant is applied.
Figure 1F:
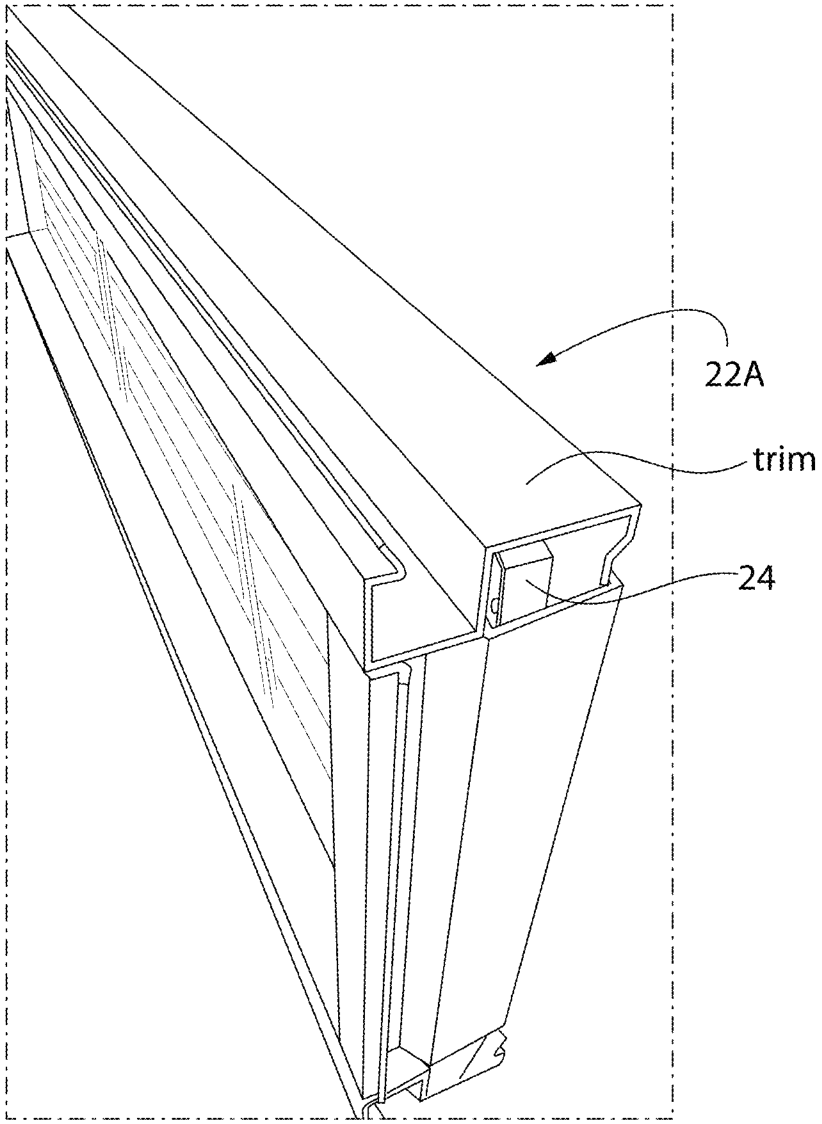
FIG. 1F is a partial isometric bottom view of the MWP panel showing a portion of the LED lighting strip at the corner.
Figure 1G:
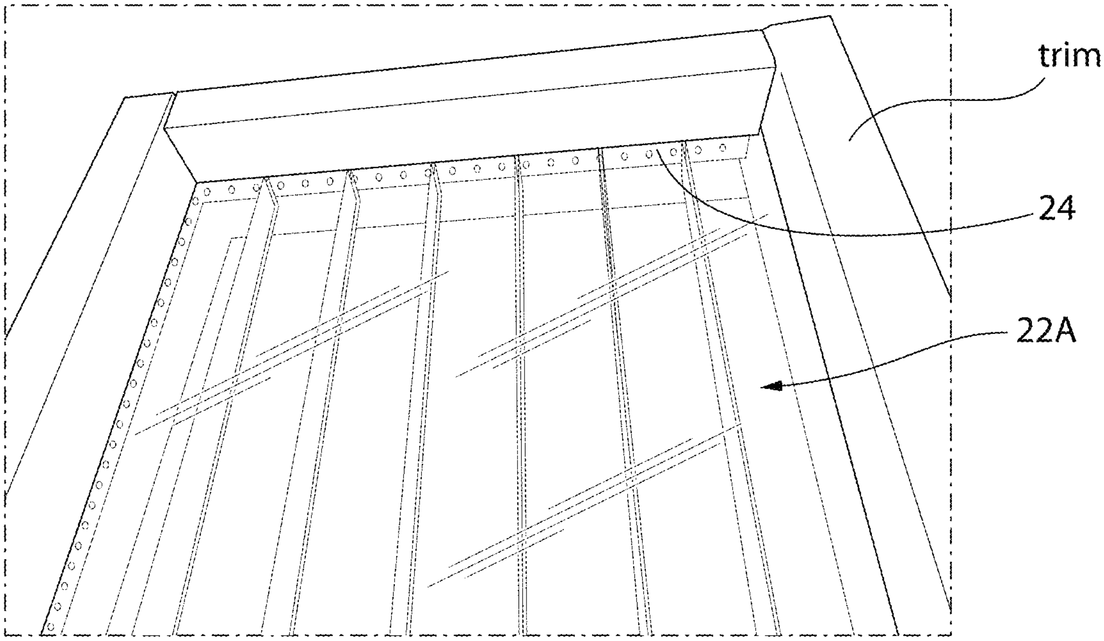
FIG. 1G is a partial view of the completed MWP panel showing the trim applied around the periphery.

Once the LED lighting strips 24 are installed along the periphery of the MWP panel 22A, the entire panel 22A is sealed with a chemical resistant sealant/tape (e.g., caulk, etc.) to create a watertight area for the LED lighting strips 24 to reside. FIG. 1E is a functional diagram of an end view of the state of the MWP panel 22 just after the sealant is applied. Once the sealant is applied, the trim is installed around the exterior of the MWP panel 22A (see FIGS. 1F-1G) for installation in the door 21 or other frame/housing.

It should be noted that the term "multiwall polycarbonate (MWP)" as used throughout this Specification is meant to cover all types of multiwall paneling, typically made of polycarbonate but also includes any clear or translucent plastic material. As such, the following materials are also covered by the term MWP: acrylic, polyethylene terephthalate (PET), amorphous copolyester (PETG), polyvinyl chloride (PVC), cyclic olefin copolymers and ionomer resin. These materials are also by way of example and are not limited to just those listed materials.

CWP Panel 22

Figure 2:
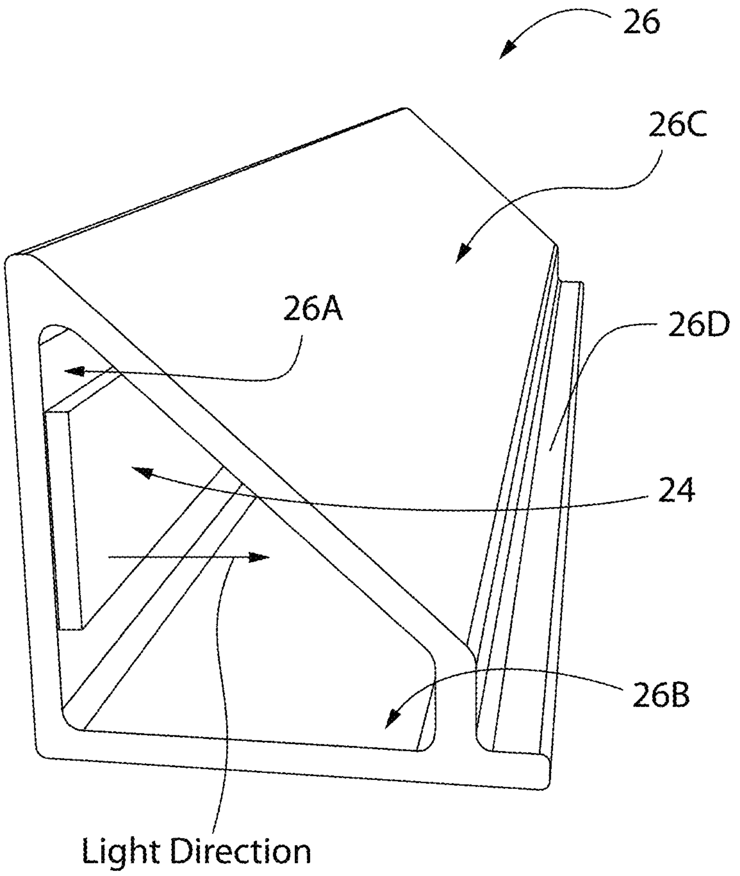
FIG. 2 is an isometric end view of a diffuser of the present invention used to form the frame of a clear window pane (CWP) panel.
Figure 2A:
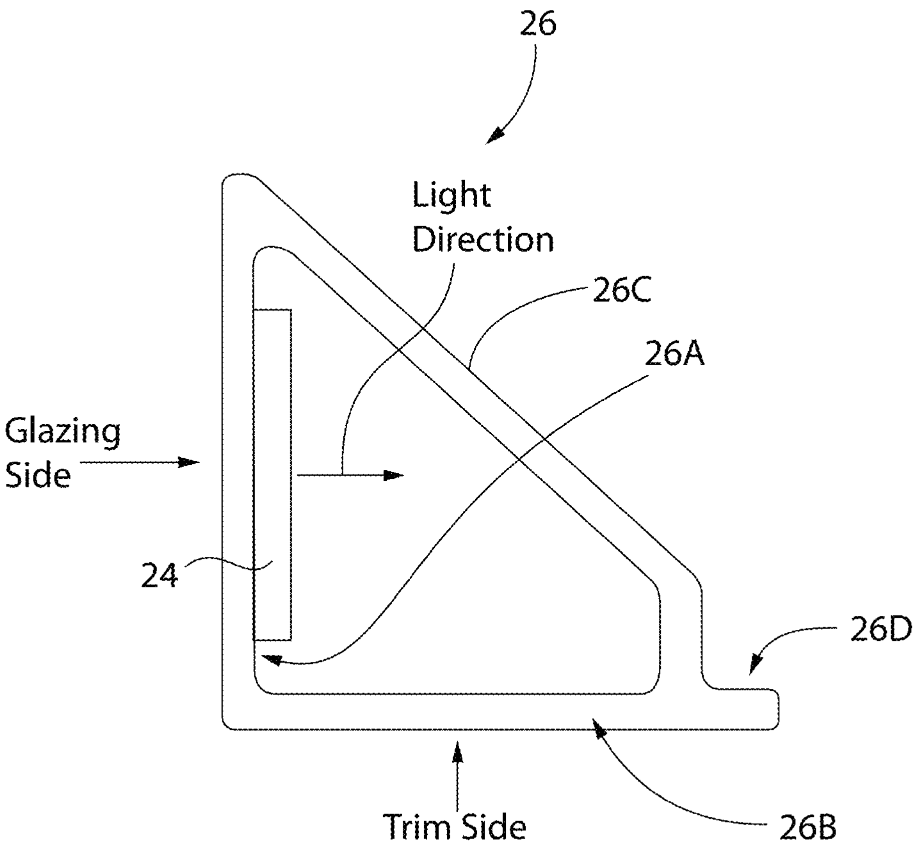
FIG. 2A is an end view of the diffuser of FIG. 2.

To provide the specialized lighting of the CWP panels 22B, the LED lighting strips are also mounted along the periphery of the CWP panel 22B. To maximize color illumination, the LED lighting strip 24 is mounted along one side of a diffuser 26 that forms the frame of the CWP panel 22B. FIG. 2 is an isometric view of a diffuser 26 showing the positioning of an LED lighting strip 24 therein. FIG. 2A is an end view of the diffuser 26. The diffuser 26 comprises a semi-transparent or translucent material that assists in enhancing the LED lighting of the CWP panel 22B. The diffuser 26 is a hollow member, having a right-triangular cross-section, and the LED lighting strip 24 (see FIG. 2A) is positioned on the vertical surface 26A ("glazing side", although it should be understood that the LED lighting strip 24 could alternatively be positioned on any of the other two surfaces 26B (known as the "trim side" or 26C ("diagonal side")) or in a differently-shaped diffusing element to create a different visual effect. The vertical surface 26A is positioned at the front side (hence "glazing side") of the CWP panel 22B. The diagonal surface 26C faces inward towards the car wash interior. A foot 26D assists in mounting the diffuser 26 to the trim of the CWP panel 22B. Again, only by way of example, the vertical surface 26A length may comprise 25.4 mm while the trim side 26B length (including the foot 26D) may comprise 25.4 mm also.

Figure 2B:
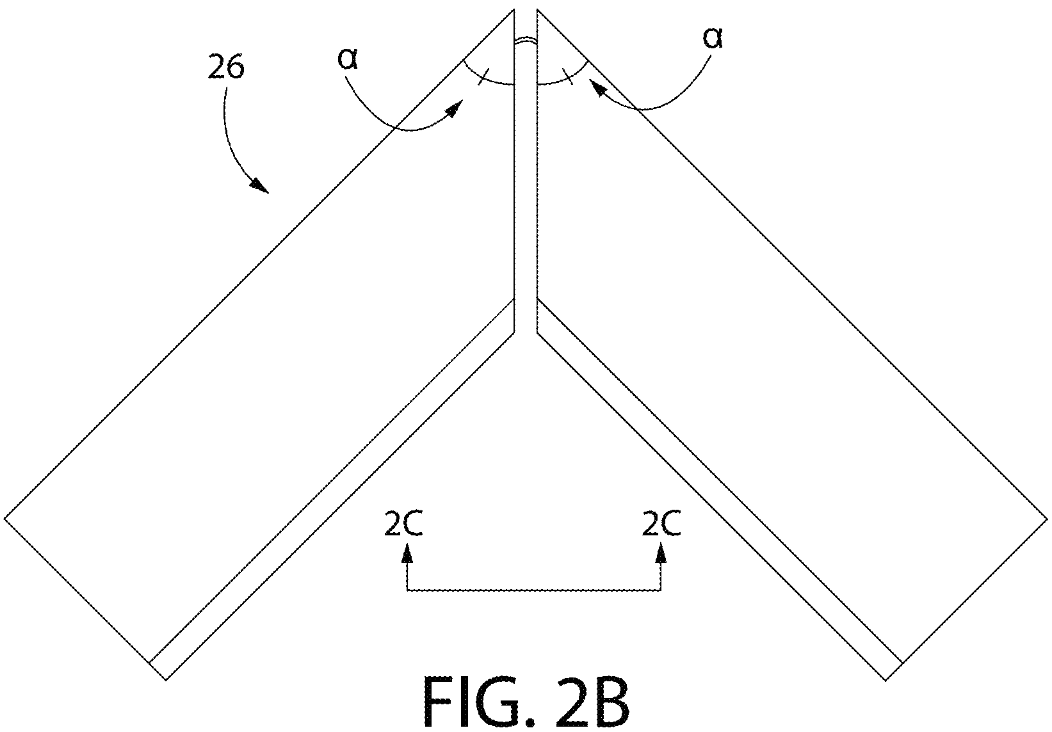
FIG. 2B shows a top view of one corner of the diffuser of FIG. 2.
Figure 2C:
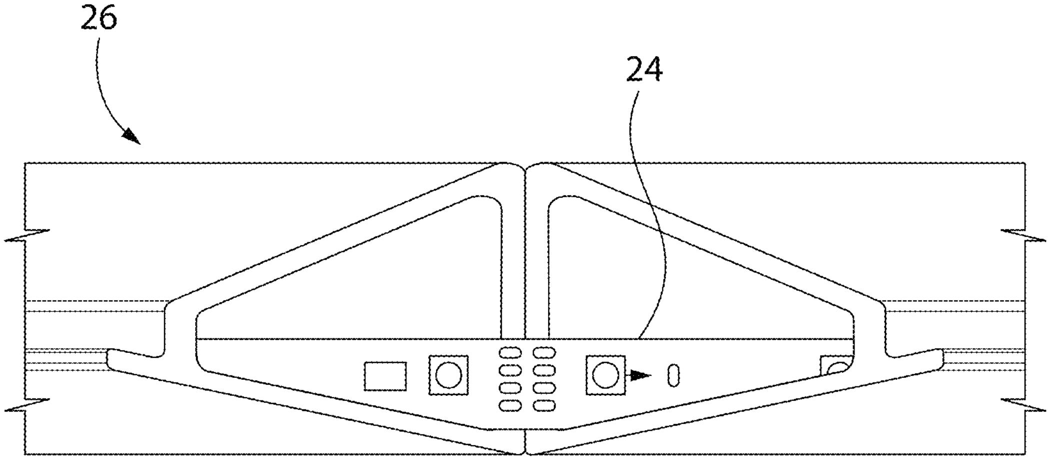
FIG. 2C shows the corner of diffuser of FIG. 2B opened up.
Figure 2D:
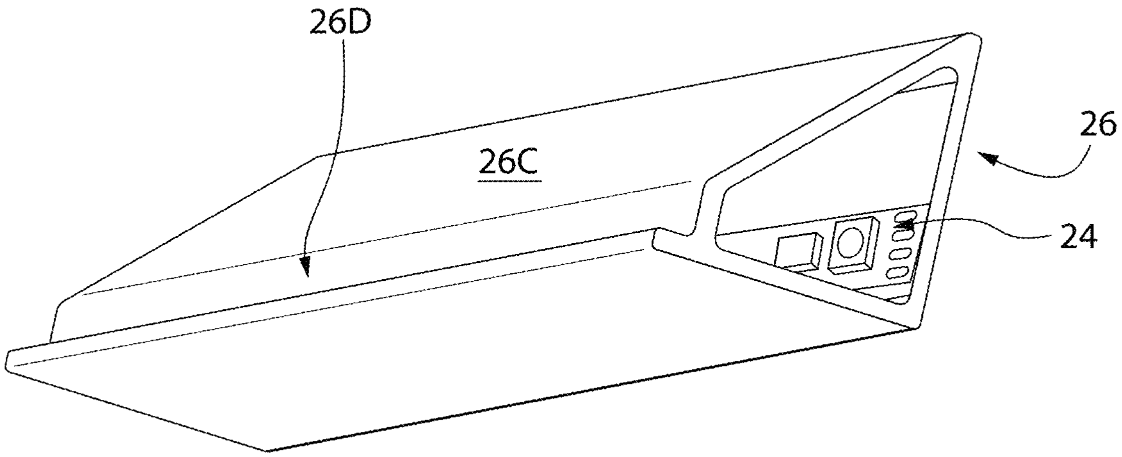
FIG. 2D shows an open end of one of the diffuser segments, revealing the LED lighting strip.

To form the CWP panel 22B, the diffuser plates are cut to the correct length to create a box which is the correct size to make a border around the inside of the panel 22B trim. They are cut on 45° angles α, (FIG. 2B) so that when joined, they create a sealed cavity for the LED lighting strips 24 to reside. The LED lighting strip 24 are inserted with the reverse side facing the outer trim side. Once the LED lighting strip 24 are inserted through all four pieces, the pieces are sealed together with the same chemical resistant sealant/tape mentioned previously with respect to the MWP panel 22A. FIG. 2B depicts the diffuser 26 having ends cut to the 45° angles α mentioned previously. FIG. 2C depicts one corner of the diffuser 26 opened up to reveal the LED lighting strip 24 therein. FIG. 2D depicts a corner end of the diffuser, showing the LED lighting strip 24 therein.

Figure 2E:
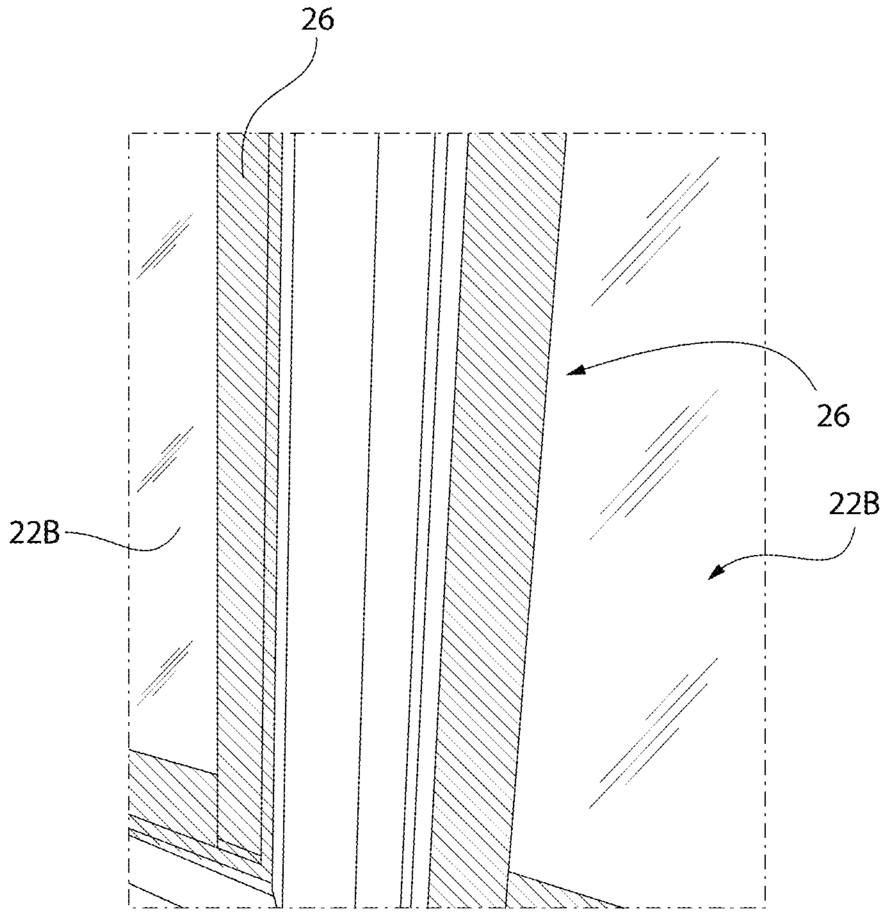
FIG. 2E depicts portions of adjacent CWP panels with the LED lighting strip energized and visual effect generated thereby.

FIG. 2E shows how the diffuser 26 disburses the LED light in the particular color (e.g., green color) and the effect achieved with the diffuser 26 to give the clear panel portion a greenish tint.

Sealed Glass/Plexiglass Unit

Figure 3:
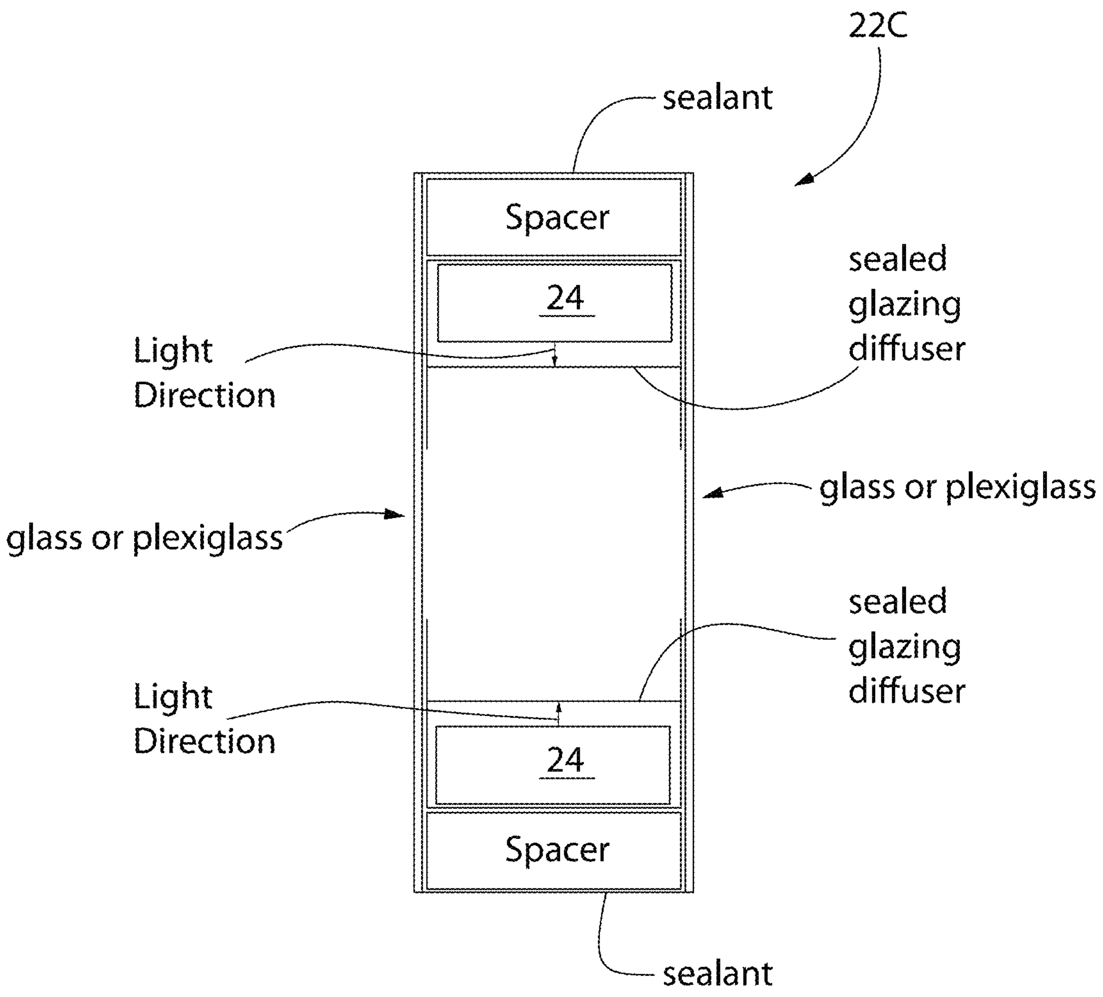
FIG. 3 is a functional diagram of an end view of a third type of panel, a sealed glass/plexiglass (or any other type of clear or translucent material) unit with the LED lighting strip inserted, prior to spacers being installed, followed by application of the chemical resistant sealant.

Although not shown in FIG. 1, there is a third type of panel 22C that can use the LED lighting strip 24 of the present invention. FIG. 3 is a functional diagram of the end view of this third type of panel 22C. To install the LED lighting strip 24 into this panel, the following procedure is followed: a normal sealed unit is created using the appropriate clear or translucent material and a spacer to create the proper finished unit thickness. Before installing the spacer to the glass, the LED lighting strip 24 and diffuser plate are positioned inside the spacer, as shown in FIG. 3. Next, the sealed unit is assembled as usual but with a chemical resistant sealant as discussed above with regard to the MWP panel 22A and the CWP panel 22B.

It should be further understood that the inventive lighting system 20 of the present invention can be retrofitted onto existing doors or can be installed in new doors.

It should also be noted that the MWP panels 22A can also be substituted by a solid translucent material of a similar thickness using the same technique of routing a channel on the perimeter of the panel to receive the LED lighting strip 24.

Moreover, it should be noted that the LED lighting strip 24 may be installed on the interior surface of the window to create other effects if desired.

Furthermore, it should be noted that the effects described above can include but are not limited to industry standard video effects such as:

Dissolves

Cuts

Fades

Wipes (Standard, shaped or rotating)

While the invention has been described in detail and with reference to specific examples thereof, it will be apparent to one skilled in the art that various changes and modifications can be made therein without departing from the spirit and scope thereof.

What is claimed is:

1. A window configured for insertion in a wall or door and for presenting visual effects using light emitting diodes (LEDs), said window comprising:

a window panel comprising a multiwall polycarbonate (MWP) material having a periphery, said MWP having a plurality of parallel internal walls, said LEDs illuminating said plurality of internal walls causing many reflections which creates the illusion of distinguishable LEDs within said window panel while providing non-uniform lighting which support said visual effects;

an LED lighting strip secured to a channel that is secured to an entirety of said periphery exclusively of said window panel of said MWP material, said LED lighting strip having a first side adjacent said periphery and a second side opposite said first side; and a chemical resistant sealant applied over said second side of said LED lighting strip.

2. The window of claim 1 wherein a trim material is applied over said entirety of periphery.

3. The window of claim 1 further comprising:

a spacer positioned around said sealed channel around said entirety of said periphery; and said chemical resistant sealant applied over said spacer around said entirety of said periphery.

4. The window of claim 3 wherein a trim material is applied over said entirety of periphery.

5. The window of claim 1 wherein said chemical resistant sealant comprises a tape.

6. A method for creating a window to have visual effects using light emitting diodes (LEDs), said method comprising:

configuring only a periphery of a window panel comprising a multiwall polycarbonate (MWP) material having internal walls to position an LED lighting strip thereabout;

sealing said periphery of said window panel using a chemical resistant sealant;

applying a trim around said sealed periphery to form said window having visual effects;

installing the window into a door or window frame; and illuminating said plurality of internal walls causing many reflections which creates an illusion of distinguishable LEDs within said window panel while providing non-uniform lighting.

7. The method of claim 6 wherein said step of configuring the periphery of the window comprises:

(a) forming a channel in said periphery of said multiwall polycarbonate (MWP) material; and (b) inserting said LED lighting strip within said channel.

8. The method of claim 7 wherein said step of sealing said periphery of said window panel further comprises:

positioning a spacer around said sealed periphery of said window panel; and applying said chemical resistant sealant over said spacer around said entirety of said periphery of said window panel.

9. The method of claim 6 wherein said step of configuring the periphery of the window comprises:

(a) forming a hollow frame of a semi-transparent material of a predetermined length that can wrap around the periphery of a transparent or translucent material forming said window panel; and (b) inserting the LED lighting strip within said hollow frame.

10. The method of claim 9 wherein said hollow member comprises a diffuser material for diffusing the light emitted from the LED lighting strip.

* * * * *